United States Patent [19]

Day et al.

[11] Patent Number: 4,753,503
[45] Date of Patent: Jun. 28, 1988

[54] LASER SCANNING SYSTEM

[75] Inventors: Gene F. Day, Boulder Creek; Stephen Barasch, Sunnyvale; Anthony J. Stramondo, Imperial Beach, all of Calif.

[73] Assignee: Benson, Incorporated, Palo Alto, Calif.

[21] Appl. No.: 571,131

[22] Filed: Jan. 16, 1984

Related U.S. Application Data

[63] Continuation of Ser. No. 237,833, Feb. 25, 1981, abandoned.

[51] Int. Cl.$^4$ .............................................. G02B 26/10
[52] U.S. Cl. .................................................... 350/3.71
[58] Field of Search ..................... 350/3.71, 6.1, 6.2

[56] References Cited

U.S. PATENT DOCUMENTS

| | | | |
|---|---|---|---|
| 3,614,193 | 10/1971 | Beiser | 350/7 |
| 3,721,486 | 3/1973 | Bramley | 350/6 |
| 3,721,487 | 3/1973 | Pieuchard et al. | 350/7 |
| 3,870,394 | 3/1975 | Ploeckl | 350/7 |
| 3,922,059 | 11/1975 | Noguchi | 350/3.5 |
| 3,951,509 | 4/1976 | Noguchi et al. | 350/7 |
| 3,984,171 | 10/1976 | Hotchkiss | 350/7 |
| 4,026,630 | 5/1977 | Wollenmann | 350/7 |
| 4,121,882 | 10/1978 | White | 350/3.71 |
| 4,133,600 | 1/1979 | Russell, et al. | 350/3.72 |
| 4,203,652 | 5/1980 | Hanada | 350/182 |
| 4,203,672 | 5/1980 | Smith, Jr. | 356/431 |
| 4,224,509 | 9/1980 | Cheng | 235/457 |
| 4,230,902 | 10/1980 | Hug et al. | 178/15 |
| 4,243,293 | 1/1981 | Kramer | 350/3.71 |
| 4,274,703 | 6/1981 | Fisli | 350/6.8 |
| 4,294,506 | 10/1981 | Hattori | 350/6.8 |
| 4,323,297 | 4/1982 | Kawamura et al. | 350/6.8 |
| 4,337,994 | 7/1982 | Brasier | 350/3.71 |

FOREIGN PATENT DOCUMENTS

| | | | |
|---|---|---|---|
| 55-450048 | 3/1980 | Japan | 350/3.71 |
| 55-135813 | 10/1980 | Japan . | |
| 55-157717 | 12/1980 | Japan . | |
| 1333087 | 3/1970 | United Kingdom | 350/3.62 |

OTHER PUBLICATIONS

J. M. Fleischer, et al., "Laser-Optical System of the IBM 3800 Printer" *IBM J. Res. Develop.*, pp. 479-483 (Sep. 1977).

*Primary Examiner*—Bruce Y. Arnold
*Attorney, Agent, or Firm*—Alan H. MacPherson; Thomas S. MacDonald; Richard Franklin

[57] ABSTRACT

A system for reproducing a raster scanned line of an image on a photoconductive surface of a drum comprising a monochromatic light source, a rotating holographic disk containing a plurality of diffraction gratings therein, and means for reflecting said monochromatic light beam so as to direct the monochromatic light beam to and along a selected straight line on the photoconductive surface of the drum. The means for reflecting the monochromatic light beam comprises an elliptic reflecting surface, a first mirror for reflecting the monochromatic light beam passed through the scanning disk to said elliptic reflecting surface, and a second mirror for receiving the monochromatic light beam reflected from the elliptical reflecting surface and for directing the reflected light beam onto a selected straight line on the photoconductive surface of the drum. The elliptic reflecting surface can, with little loss in accuracy, be replaced by a cylindrical surface.

10 Claims, 2 Drawing Sheets

LASER SCANNING SYSTEM

CROSS REFERENCE TO RELATED APPLICATION

This is a continuation application of Ser. No. 06/237,833 filed Feb. 25, 1981, now abandoned.

BACKGROUND OF THE INVENTION

1. Field of the Invention

This invention relates to the production of permanent copies of electronic images and more particularly to the formation of a plurality of lines of information on a recording medium, such as a drum possessing a photoconductive surface, thereby to allow a hard copy of the electronic image to be produced in a well-known manner. This invention also relates to a laser scanning system and in particular to a low cost laser scanning system using a solid state injection laser.

2. Description of the Prior Art

The use of recording media containing photoconductive material on their surfaces for the intermediate storage of images to be reproduced on a material such as paper is well-known in the art. See, for example, U.S. Pat. Nos. 4,230,902 and 3,951,509. One problem in these systems is that the optics required to scan each line of an image across a particular recording medium (such as a rotating drum with a photoconductive material on its surface) in a straight line are quite expensive. Moreover these optics must be accurately aligned to ensure proper operation of the system. Holographic (or holofacet) scanning across the drum offers a cost effective method for repetitive mechanical scanning of a monochromatic light beam which is modulated as a function of time in order to replicate the line of information being stored on the photoconductive drum. This type of raster scanning technique of an image is particularly adapted for use with systems wherein the image to be reproduced is stored in a computer memory in the form of bits of information (representing either a black or white dot) derived by raster scanning each line of the image to be reproduced. The monochromatic light beam is then modulated as a function of the status of each bit in each raster scanned line and is deflected along a line on the drum parallel to the rotation axis of the drum. The drum is rotated at a slow rate relative to the formation of each line of raster-scanned information on the surface of the drum. A holofacet scanning system offers a way of deflecting the monochromatic light beam along a line on the photoconductive drum surface parallel to the axis of rotation of the drum surface which is relatively inexpensive.

A holographic scanning disk suitable for this purpose contains a plurality of diffraction gratings mounted around the outer area of the disk. The disk is preferably arranged to be nonperpendicular to the light beam from the monochromatic light source such that the light beam intersects the diffraction gratings as the disk rotates. By arranging the disk to be nonperpendicular to the light beam, the adverse effects of disk wobble are minimized. As disclosed in U.S. Pat. No. 3,721,486, the rotation of the disk results in the diffracted light beam producing a focused spot which sweeps over a plane surface in an arc. The arc comprises the intersection of a cone with a plane wherein the axis of the cone is perpendicular to the plane. (See, for example, U.S. Pat. No. 4,094,576.) One technique for straightening this line is disclosed by Ih in a paper entitled "Holographic Laser Beam Scanners Utilizing an Auxiliary Reflector" published on page 2137 of the Aug. 1977 issue of Applied Optics (Vol. 16, No. 8). Another technique for doing this is disclosed in a paper by Pole et al. published in an article entitled "Holographic Light Deflection" on page 3294 of Applied Optics, Oct. 15, 1978, Vol. 17, No. 20. See also U.S. Pat. No. 3,951,509 for a description of another technique.

The use of laser scanning systems for the purpose of producing a line of information on a photoconductive surface in a copier system is well known. A typical system of this type is disclosed for example in U.S. Pat. No. 3,750,189. One problem in such a system is to provide a source of collimated, monochromatic light. Typically, this is provided by use of a modulated gas laser. Gas lasers and their modulators, as well as their associated scanning systems, unfortunately are quite expensive. Accordingly, there is a need for a low cost scanning system with the advantages of a gas laser scanning system.

There is also need for a structure which will allow the use of a holographic scanning disk and a monochromatic light source for the purpose of reproducing a straight line image on a photoconductive cylindrical surface which is both inexpensive and accurate.

SUMMARY OF THE INVENTION

This invention provides a structure which alters from a curved to a straight line a repetitively scanned raster line from a monochromatic light source which is passed through a holographic scanning disk. This invention employs a simple optical system for correcting the curvature of the monochromatic light beam passed through the holographic scanning disk to yield a straight line scan.

In accordance with this invention, a monochromatic light beam passed through a holographic scanning disk containing a diffraction grating is reflected off the interior surface of an elliptic cylinder, one focal axis of which is the desired raster scan line on the cylindrical photoconductive surface of the drum, and the other focal axis of which passes through the diffraction zone on the holographic scanning disk. The result is that the monochromatic beam passed through the holographic scanning disk is correctly focused as a straight line on the cylindrical drum containing the photoconductive material. This straight line is parallel to the rotational axis of the cylindrical drum.

In one embodiment, the surface of the elliptic cylinder can be replaced by a circular cylindrical surface, particularly if the optical system is designed such that two focal points of the elliptical mirror are required to lie very close together. The resulting structure is easily manufactured and corresponds to an elliptic cylinder of very slight eccentricity. The approximation of the elliptical mirror by a circular cylindrical mirror results in a structure which is relatively inexpensive to develop and which yields satisfactory accuracy for most applications.

A second embodiment of this invention provides a system which uses low cost components, including a solid state injection laser and a holographic scanner, but which provides the resolution, accuracy and speed of a higher cost system using a standard collimated, monochromatic light beam from a gas laser whose power output is modulated by an external modulator of well-known design.

In accordance with this second embodiment of this invention, a laser system employs a solid state laser diode producing a divergent beam of non-circular cross section, together with an anamorphic optical system to produce a monochromatic light beam which is collimated at one point and which has a circular cross section at the image plane. The system further employs a holographic disk for directing a light beam in a circular arc across a plane and an elliptical mirror located at an appropriate point to correct the curved arc output from the holographic laser scanner to a straight line on the surface of a photoconductive drum.

This invention will be more fully understood in light of the following detailed description taken together with the drawing.

DETAILED DESCRIPTION OF THE INVENTION

Figure 1:
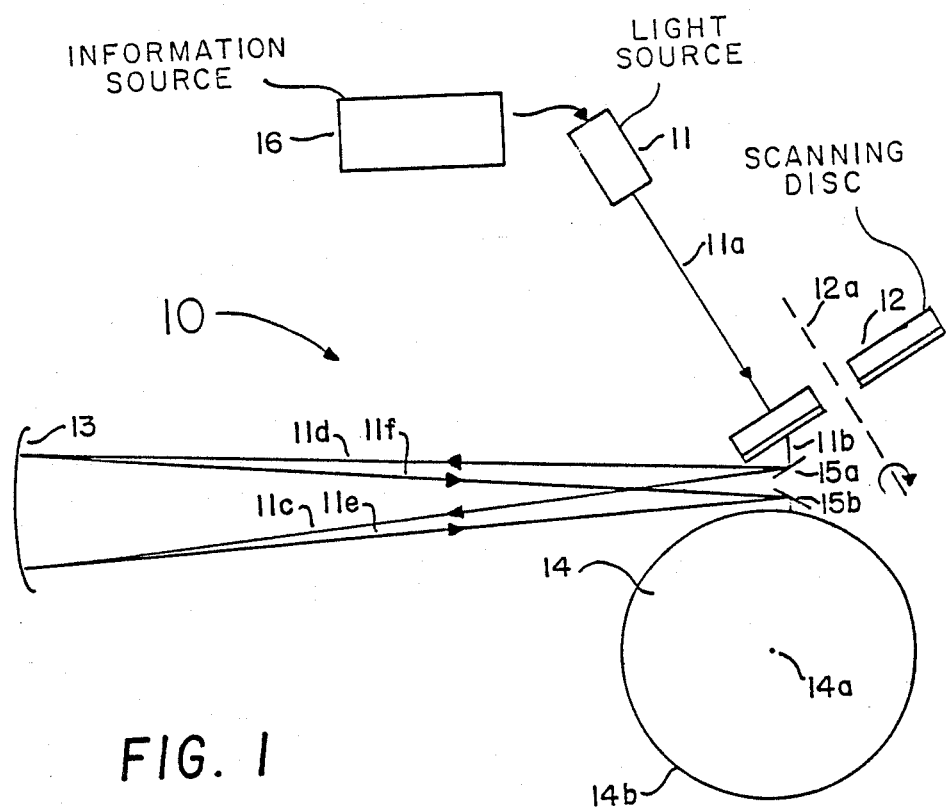
FIG. 1 illustrates the system of this invention wherein an elliptical mirror is used to focus the monochromatic scanned light beam containing the information to be reproduced on a straight line parallel to the axis of rotation of a cylinder coated with a photoconductive material.

As shown in FIG. 1, a monochromatic light source 11 produces a monochromatic light beam 11a which is directed toward the holographic scanning disk 12. Disk 12, mounted to rotate about axis 12a is driven by an electric motor of a well-known design in such a manner that the rotation of disk 12 is synchronized with the readout of information used to modulate the monochromatic light beam 11a. The information used to modulate light beam 11a is derived from information source 16 which is shown schematically only. Source 16 is of well-known construction and might, for example, comprise a computer memory and appropriate accessing and logic circuitry. The structure for modulating monochromatic light source 11a is also well-known in the art and thus will not be described.

Figure 2:
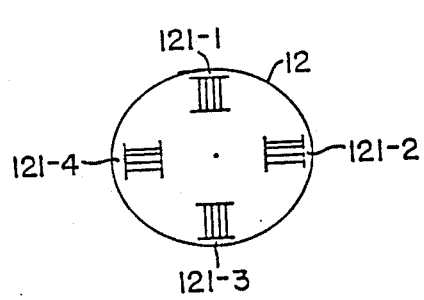
FIG. 2 shows schematically in plan view a typical holographic scanning disk employed with this invention.

Modulated light beam 11a is passed through a diffraction grating (of well-known design) such as any one of gratings 121-1 through 121-M shown on scanning disk 12 in FIG. 2 (where M is a selected integer equal to the number of diffraction gratings on disk 12). In FIG. 2, M is shown as four (4) but a typical disk will have many more gratings; for example, twelve are used in one embodiment The rotational velocity of disk 12 is synchronized such that any one of diffraction gratings 121-m (where m is an integer which can vary from 1 to M) first intercepts the monochromatic light beam 11a at the time this light beam is modulated with the first bit of information to be stored in a straight line on the photoconductive surface -b of photoconductive drum 14. The diffraction grating 21-m then sweeps across the modulated light beam in synchrony with the modulation of this beam such that the information in one raster line stored in information source 16 is stored on a corresponding line on the photoconductive surface 14b of drum 14. The light beam 11a sweeps in an arc across the surface 14b unless compensated. Thus, in accordance with this invention, elliptical mirror 13 is provided and located such that mirror 15a, located near one focal axis of the elliptic mirror 13, reflects the light 11b which is passed through the diffraction grating 121-m (which is at one reflected focal axis of mirror 13) into path 11c at the start of the scan. The light from path 11c is reflected by elliptical mirror 13 onto the second focal axis of elliptical mirror 13 located on a line on the photoconductive surface 14b of cylinder 14. The light is thus reflected from mirror 15b onto a particular straight line on the photoconductive surface 14b of cylinder 14. As the disk 12 rotates, the light beam 11b passed through diffraction grating 121-m of scanner 12 continues to be reflected from mirror 15a to the surface of mirror 13. Thus, at the middle of the scan, this light follows line 11d which reaches the top of the arc being formed by this light beam and which is then reflected back along line 11f to the mirror 15b and then to photoconductive surface 14b of drum 14. Thus the sweep of beam 11b as reflected by mirror 15a across the surface of elliptic mirror 13 in an arc has been converted to a substantially straight line formed along the photoconductive surface 14b of drum 14. This line is parallel to the axis 14a of rotation of drum 14 (axis 14a is perpendicular to the plane of the drawing of the drum as shown in FIG. 1).

Figure 3:
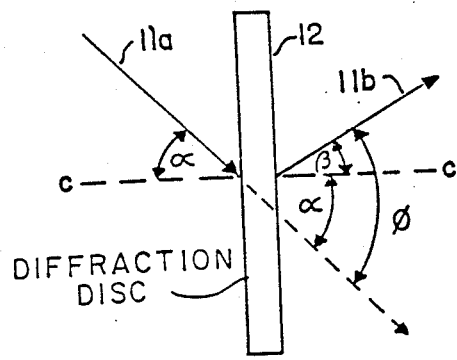
FIG. 3 shows the relationship between the light beam incident to the diffraction disk to the light beam diffracted by the diffraction disk.

In one preferred embodiment diffraction disk 12 is positioned nonperpendicular to incident light beam 11a (see FIG. 3). In this manner, the effect of disk wobble (a change in angle $\beta$) on the beam 11b diffracted from disk 12 (a change in angle $\alpha$) may be minimized. Referring to FIG. 3 it is well-known that:

$$d(\sin\alpha + \sin\beta) = \lambda \quad (1)$$

and $$\theta = \alpha + \beta$$

where d = the pitch of the diffraction gratings;
$\alpha$ = angle of incidence of light beam 11a;
$\beta$ = angle of diffraction of light beam 11b;
$\lambda$ = wavelength of the emitted light.

Thus, $$\sin\alpha + \sin(\theta - \alpha) = \lambda/d \quad (2)$$

Utilizing a monochromatic light source and fixed diffraction gratings, $\lambda/d$ is constant.

By differentiating equation (2) with respect to $\alpha$, and setting the derivative equal to zero, an angle $\alpha$ may be found where the effect of disk wobble ($\Delta\theta$) is minimized:

$$0 = \cos\alpha + \cos(\theta - \alpha)\frac{d\theta}{d\alpha} - \cos(\theta - \alpha) \quad (3)$$

$$\frac{d\theta}{d\alpha} = \frac{\cos\alpha - \cos(\theta - \alpha)}{-\cos(\theta - \alpha)} = 0 \quad (4)$$

$$\cos\alpha = \cos(\theta - \alpha) \quad (5)$$

$$\theta = 2\alpha \quad (6)$$

Obviously, utilizing the well-known optical relationships of equation (1), and basic calculus, it is apparent that in order to minimize the effect of disk wobble ($\Delta\theta$), the system must be designed such that $\theta = 2\alpha$, or in other words, $\alpha = \beta$.

Elliptical cylindrical mirror 13 can, for simplicity, be replaced by a circular cylindrical mirror. Since a circle is merely an ellipse with equal major and minor axes, the use of a circular cylinder can, in some circumstances, sufficiently approximate an elliptic cylinder to allow satisfactory raster scanning of the image line on photoconductive surface 14b. In this embodiment, the accuracy with which the approximation is achieved depends upon the separation of the focal axes of the elliptic cylinder and the desired linearity of each raster scan line formed on photoconductive surface 14b of cylinder 14.

The equation of an ellipse is given as:

$$(X^2/a^2) + (Y^2/b^2) = \quad (7)$$

The eccentricity of an ellipse is defined as:

$$e = \frac{\sqrt{a^2 - b^2}}{a} \quad (8)$$

$\sqrt{a^2 - b^2}$ is equal to the distance from the center of the ellipse to either foci. The distance from one foci to a point on the ellipse to the other foci is equal to $2a$. Thus, in a typical system where the distance from the center of the ellipse to a foci is approximately 25 millimeters and the distance between foci through a point on the ellipse is approximately 1000 millimeters, the eccentricity is 0.05, or five percent. Thus, in this system, utilizing a circular cylindrical mirror (whose eccentricity is zero, by definition) as an approximation of an elliptical mirror will introduce an inaccuracy of at most only five percent at the extremities of the scan. This is sufficiently accurate for most uses of this invention.

Figures 5A, 5B, 5C:
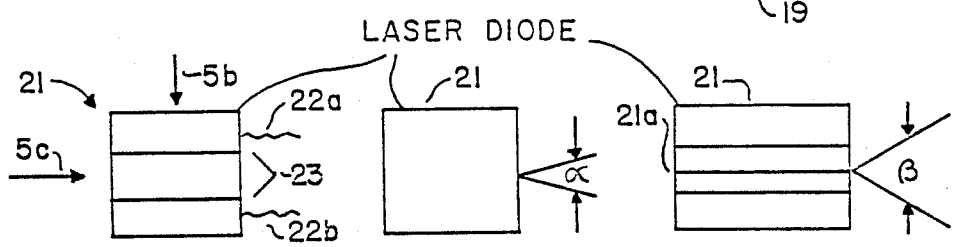
FIG. 5a illustrates a solid state laser diode used with this invention.
FIGS. 5b and 5c illustrate the divergent angles parallel and perpendicular, respectively, to the junction of the laser of the light beam emitted by the solid state laser.

In the preferred embodiment, a solid state laser diode 21, such as shown schematically in FIGS. 5a, 5b and 5c, is used as a source for monochromatic light beam 11a, rather than a gas laser with external modulator. In the preferred embodiment the solid state injection laser diode comprises a GaAlAs laser diode 21 of well known construction containing a P type region 22a, an N type region 22b and a PN junction region 23 between the two. This diode produces a divergent beam of non-circular cross section. The angle $\beta$ of divergence of the beam in a direction perpendicular to the plane of the junction (as shown in FIG. 5c) is typically much greater than the angle $\alpha$ of divergence of the beam in a direction parallel to the plane of the junction (as shown in FIG. 5b). Thus, the divergence of the beam of the GaAlAs solid state diode 21 perpendicular to its junction is typically about 40 degrees while the divergence of the beam in the direction parallel to its junction is typically about 10 degrees. The angle of divergence of the beam is a function of the size of the laser diode junction 23 (as junction size increases, divergence decreases). The solid state laser diode typically has not been used as an optical source for a laser scanning system because it produces a non-circular, diverging beam. On the contrary, a gas laser produces a collimated beam of monochromatic light with a circular cross section and thus has been used for this purpose.

The spot size of a beam produced from a laser diode is given by the following equation: $d_o = (4\lambda/\pi)F_\#$ where $d_o$ is the spot size, $\lambda$ is the wave length of the light beam produced by the diode, and $F_{190}$ is a measure of the divergence of the light beam equal to the ratio of the focal length to the diameter of the aperture through which the beam is passed. With a solid state laser diode, the beam divergence of the system differs in the direction perpendicular to the junction compared to the direction parallel to the junction.

In accordance with this invention, a solid state laser diode is rendered usable in a laser scanning system such as used in a laser scanning printer by using a specially designed anamorphic lens system. In particular, the system employs two cylindrical lenses with different radii of curvature in mutually perpendicular planes. These cylindrical lenses are located in different positions in the optical path of the output beam.

Figure 6A:
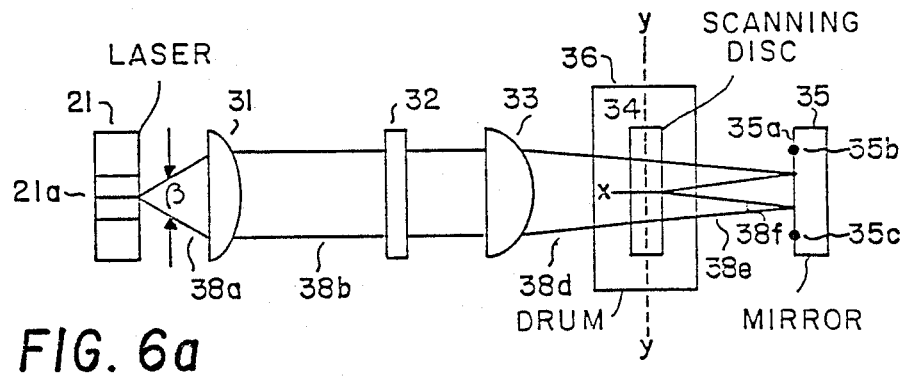
FIGS. 6a and 6b illustrate the optical system used with the solid state laser beam of this invention to produce from the divergent light beam produced perpendicular and parallel to the PN junction of the diode of FIG. 5a , respectively a monochromatic light beam which is collimated at one point and which has a circular cross-section at the image plane.
Figure 6B:
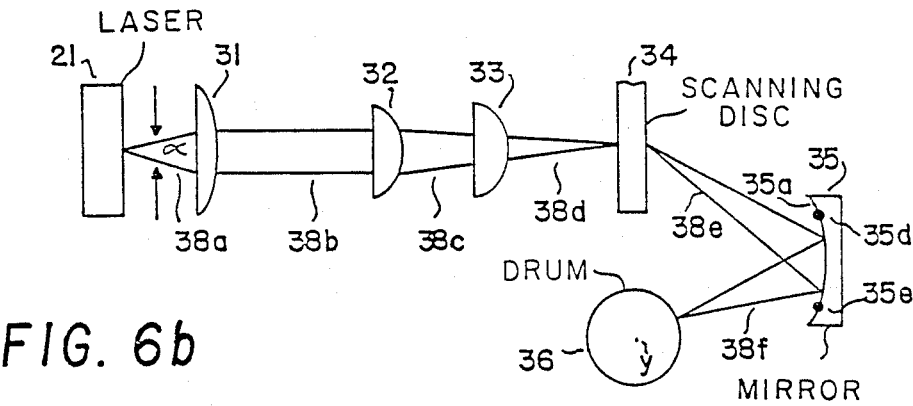

The lens system used in this invention is shown in FIG. 6a from a perspective in the plane of the PN junction 21a of the laser diode 21 and in FIG. 6b from a perspective perpendicular to the plane of the PN junction 21a of the laser diode 21. Thus, in FIG. 6a the solid state laser diode 21 produces a diverging output beam 38a shown to diverge with the angle $\beta$ in the plane perpendicular to the plane of the PN junction 21a and shown in FIG. 6b to diverge with the angle $\alpha$ in the plane parallel to the PN junction 21a. Beam 38a is then passed through a lens 31 (which may be either spherical or anamorphic) providing a collimated beam 38b having a first width of 12 mm perpendicular to the PN junction of diode 21 and a second width of 4 mm in the direction parallel to the plane of the PN junction of diode 21. The beam 38b is then passed through cylindrical lens 32 and lens 33 (which may be either spherical or anamorphic) which are oriented so as to focus the beam 38d in the plane parallel to the PN junction of diode 21 onto a holographic scanning disk 34. The beam 38d from lens 33 is then passed through holographic scanning disk 34 of well known construction. Scanning disk 34 has formed in a well known manner on one surface a plurality of diffraction gratings. In one preferred embodiment, scanning disk 34 contains a plurality of sets of diffraction gratings, each set containing a plurality of parallel diffraction gratings. The passage of the beam 38d through one set of diffraction gratings of the holographic disk 34 results in a diffracted beam of the first order being produced on the other side of holodisk 34. This beam is then rotated across a reflecting surface 35a on cylindrical mirror 35 as the holodisk 34 rotates about its X axis. The resulting beam 38e sweeps a point of circular cross-secton in an arc over the reflecting surface 35a of mirror 35. Reflecting surface 35a is preferably elliptical, but in many instances by proper selection of the focal lengths, can be made circular without significant loss of accuracy.

The beam passed through holographic scanner 34 is swept across mirrored surface 35a from point 35b to point 35c. In sweeping this arc in a direction perpendicular to the junction 21a of diode 21, the beam moves vertically from points 35d to 35e as shown in FIG. 6b. Point 35e is the lowest point reached by the beam 38e at the beginning and end of the scan whereas point 35d is the highest point reached by this beam during the midpoint of the scan.

The beam 38f reflected from surface 35a of mirror 35 is then transmitted to drum 36 upon a line parallel to the rotational axis Y of drum 36 upon the surface of which is formed a photoconductive coating. Drum 36 is thus the recipient of a raster of lines of information represented by the intensity of light beam 38f derived from laser diode 21. By modulating the current through the PN junction 21a of this diode, the intensity of the light beam emitted by laser diode 21 is varied in a well-known manner thereby to vary the intensity of the beam 38f in a line on drum 36. The result is to store different levels of charge on the line on drum 36. Drum 36 is then used to make a copy of the information used to derive the signal used to modulate the output signal from diode 21.

Figure 4:
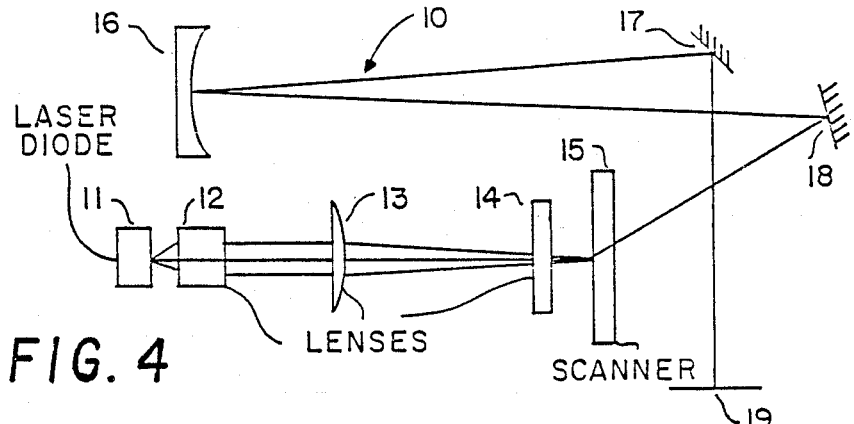
FIG. 4 comprises a schematic drawing of the low cost system for producing the laser scanning beam of this invention

FIG. 4 illustrates schematically the structure of this invention. As shown in FIG. 4, laser diode 11 produces an output beam which is passed through collecting lens 12 which collects and collimates the output light from diode 11. The output signal from lens 12 has an elliptical cross section because of the difference in the divergence angles of the light beam perpendicular and parallel to the junction of the laser. Taking advantage of this difference, cylindrical lens 13, with its axis of rotation perpendicular to the junction, focuses the minor axis of the light onto the holographic scanner 15 while anamorphic or spherical lens 14 focuses the major axis through the scanner onto the image plane 19. This allows the focused beam on the hologram to be located at one of the axes of an elliptical cylindrical mirror 16. The mirror 16 reimages the beam, corrects the arcuate scan generated by the parallel grating holographic scanner by imaging this beam to the other focal axis of elliptical cylindrical mirror 16, thus producing a straight line raster scan which is sharply focused at the image plane.

As shown in FIG. 4, the lens system associated with the solid state laser diode comprises several components. Lens 12 has a numerical aperture structure of 0.65 and a focal length of 9 millimeters. From lens 12 (corresponding to lens 31 shown schematically in FIGS. 6a and 6b) the beam is passed through lens 13 which comprises a cylindrical lens which focuses light only in the plane shown in the side view in FIG. 6b. This lens has a focal length of 300 millimeters. The light beam from lens 13 (corresponding to the lens 32 in FIGS. 6a and 6b) is then transmitted to spherical lens 14 (corresponding to lens 33 in FIGS. 6a and 6b). Lens 14 has a 1000 millimeters focal length. Thus the light from lens 14 is passed through holographic disk 15 rotated at a rate synchronized with the rate at which data is being read onto a line on the photoconductive surface 19 (corresponding to the photoconductive surface of drum 36 in FIGS. 6a and 6b). This light then creates a first order diffraction beam which is reflected from mirror 18 (shown in FIG. 4, but not shown in FIGS. 6a and 6b for simplicity) and is then reflected off elliptical cylindrical mirror 16 back to mirror 17 (shown in FIG. 4 but not shown in FIGS. 6a and 6b for simplicity) and then onto the photoconductive surface 19 (FIG. 4) of drum 14 (FIG. 1) corresponding to drum 36 in FIGS. 6a and 6b.

The scanning system of this invention has a large depth of focus thus eliminating the need for flat field correction. This large depth of focus is due to the large $F_\#$ of the system. As previously mentioned, $F_\#$ is a measure of the divergence of the light beam and is equal to the ratio of the focal length to the diameter of the aperture through which the beam is passed. Thus, in a first axis, the $F_\#$ of the light beam is equal to 1000 mm/12 mm $\approx$ 85. (Lens 14 has a 1000 mm focal length and the light beam has a first diameter of 12 mm perpendicular to the PN junction of diode 21.) In the axis parallel to this first axis, the $F_\#$ of the light beam is equal to 300 mm/4 mm $\approx$ 75. (Lens 13 has a 300 mm focal length and the light beam has a second diameter of 4 mm in the direction parallel to the plane of the PN junction of diode 21.)

To simplify the geometry of the elliptical cylindrical mirror 16, (corresponding to mirror 35 in FIGS. 3a and 3b), both focal axes are chosen close to each other so that the slightly eccentric elliptic cylinder is approximated by a circular cylinder. This reduces the complexity of manufacture.

This system provides several advantages.

1. The scanner has a high duty cycle due to the small ratio of the width of the focused beam on the hologram to the width of each facet of the hologram.

2. The scanner system is insensitive to wobble or translation of the hologram disk due to the nature and positioning of the hologram and the re-imaging of the cylindrical mirror 16.

3. The scanner provides curved scan correction to a straight line raster scan at the image plane.

4. The scanner has a large depth of focus eliminating the need for flat field correction. (This is particularly important to allow a quality image to be reproduced on the image plane).

5. The scanner provides self-alignment and a fixed focal point of the scanned beam when the wave-length source is changed.

6. The scanner beam shapes for better image resolution.

7. The scanner system has a low cost and is easily fabricated.

While one embodiment of the system has been described, other variations of the system will be obvious to those skilled in the art in view of this description.

What is claimed is:

1. A system for reproducing a raster scanned line of an image on a photoconductive surface of a cylindrical drum comprising:
    means for emitting a monochromatic light beam;
    means for causing said light beam to scan a line; and
    means for reflecting said light beam comprising a reflecting interior surface of an elliptic cylinder so as to direct said light beam to and along a selected straight line on said photoconductive surface of said drum.

2. Structure as in claim 1 wherein said means for causing comprises a holographic disk containing a plurality of diffraction gratings therein, and means for rotating said disk, said disk being oriented so as to allow said monochromatic light beam to pass through a selected diffraction grating in said disk during the formation of a raster scan line on said photoconductive surface of said drum when said disk is being rotated.

3. Structure as in claim 2 wherein said means for reflecting said light beam further comprises:
- a first mirror for reflecting the light beam passed through said holographic disk to said reflecting interior surface of said elliptic cylinder; and
- a second mirror for receiving the light beam reflected from said reflecting interior surface of said elliptic cylinder and for directing said reflected light beam onto a selected straight line on said photoconductive surface of said drum.

4. Structure as in claim 3 wherein the selected diffraction grating in said holographic disk through which is passed said light beam is located at the first focal axis of said elliptic cylinder and said selected straight line on said photoconductive surface of said drum to which said second mirror directs said light beam reflected from said reflecting interior surface of said elliptic cylinder is located at the second focal axis of said elliptic cylinder.

5. Structure as in claim 2 including means for synchronizing the rotation of said drum with the rotation of said holographic disk such that said photoconductive surface of said drum is properly positioned so that the light beam passed through said holographic disk at the start of a scan cycle is incident on said drum at one edge of said drum and gradually sweeps in a straight line across the surface of said drum parallel to the axis of said drum as a selected diffraction grating on said holographic disk is rotated past said light beam from said means for emitting.

6. Structure as in claim 5 including means for modulating the intensity of the monochromatic light beam in response to stored information.

7. Structure as in claim 1 wherein said light source is a GaAlAs laser diode.

8. A system for reproducing a raster scanned line of an image on a photoconductive surface of a cylindrical drum comprising:
- means for emitting a monochromatic light beam;
- means for causing said light beam to scan a line, comprising a holographic disk containing a plurality of diffraction gratings therein, and means for rotating said disk, said disk being oriented so as to allow said monochromatic light beam to pass through a selected diffraction grating in said disk during the formation of a raster scan line on said photoconductive surface of said drum when said disk is being rotated; and
- means for reflecting said light beam comprising a reflecting interior surface of an elliptic cylinder so as to direct said light beam to and along a selected straight line on said photoconductive surface of said drum;
- wherein the diffraction gratings in said rotating holographic disk through which is passed said light beam are located at the first focal axis of said elliptic cylinder and said selected straight line on said photoconductive surface of said drum to which said second mirror directs said light beam reflected from said reflecting interior surface of said elliptic cylinder is located at the second focal axis of said elliptic cylinder.

9. Structure as in claim 8 wherein said means for reflecting said light beam further comprises:
- a first mirror for reflecting the light beam passed through said holographic disk to said reflecting interior surface of said elliptic cylinder; and
- a second mirror for receiving the light beam reflected from said reflecting interior surface of said elliptic cylinder and for directing said reflected light beam onto a selected straight line on said photoconductive surface of said drum.

10. A system for reproducing a raster scanned line of an image on a photoconductive surface of a cylindrical drum comprising:
- means for emitting a monochromatic light beam;
- means for causing said light beam to scan a line, comprising a holographic disk containing a plurality of diffraction gratings therein, and means for rotating said disk, said disk being oriented so as to allow said monochromatic light beam to pass through a selected diffraction grating in said disk during the formation of a raster scan line on said photoconductive surface of said drum when said disk is being rotated; and
- means for reflecting said light beam comprising:
- a reflecting interior surface of a circular cylindrical reflective surface closely approximating the reflecting interior surface of an eliptical cylinder required to produce a straight raster scan on the photoconductive surface of said drum;
- a first mirror for reflecting the light beam passed through said holographic disk to said reflecting interior surface of said circular cylindrical reflective surface; and
- a second mirror for receiving the light beam reflected from said reflecting interior surface of said circular cylindrical reflective surface and for directing said reflected light beam onto a selected straight line on said photoconductive surface of said drum;
- wherein the diffraction gratings in said holographic disk through which is passed said light beam are located approximately at the center of the circle which defines said circular cylindrical reflective surface and said selected straight line on said photoconductive surface of said drum to which said second mirror directs said light beam reflected from said reflecting interior surface of said circular cylindrical reflective surface is located approximately at the center of the circle which defines said circular cylindrical reflective surface.

* * * * *